March 16, 1943. D. L. PUTT 2,313,768
CONTROL LEVER
Filed May 24, 1941 2 Sheets-Sheet 1
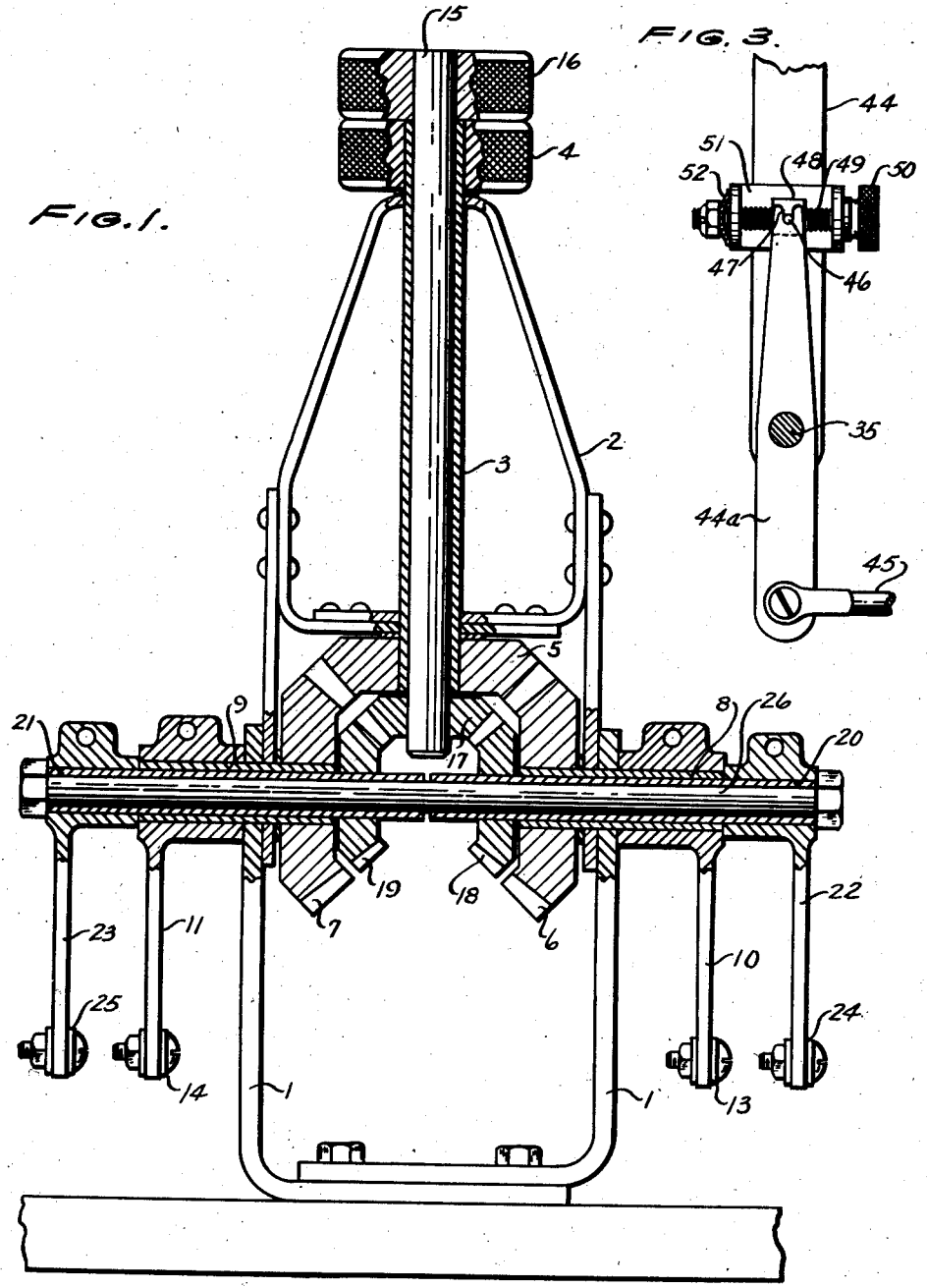

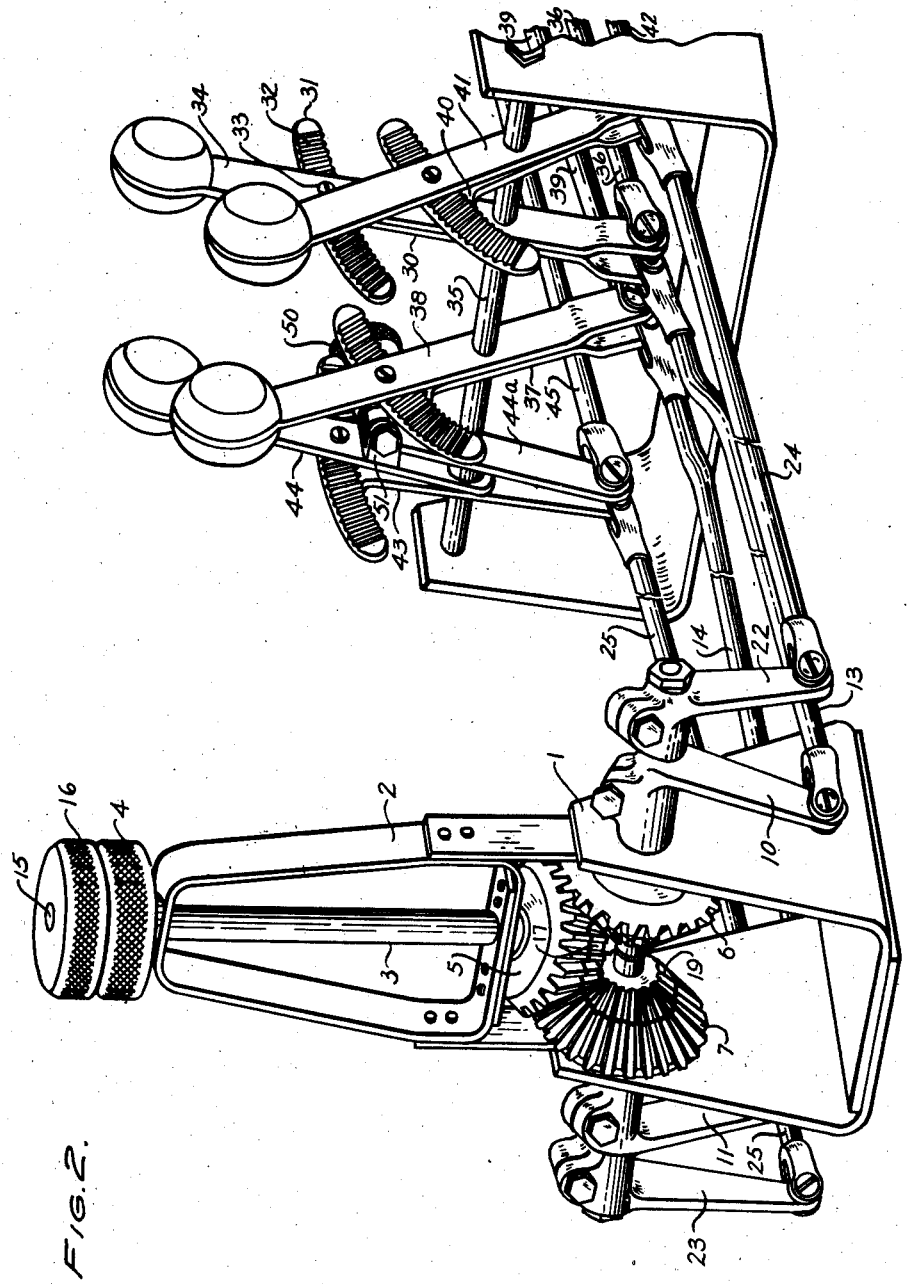

Patented Mar. 16, 1943

2,313,768

UNITED STATES PATENT OFFICE 2,313,768

CONTROL LEVER

Donald L. Putt, Fairfield, Ohio

Application May 24, 1941, Serial No. 395,020

4 Claims. (Cl. 74—471)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a novel control mechanism for differentially or simultaneously controlling aircraft engine throttles, carburetor mixture controls, manual propeller pitch adjustment controls and the like and is particularly adapted for use on multi-engine aircraft employing for example four or more engines.

It has heretofore been proposed in the prior art to provide a control system for throttles and the like in which one pair of throttle control elements are differentially connected to alternately increase the setting of the one control and decrease the setting of the other control, and the arrangement being such that both controls may be actuated to be simultaneously increased or decreased. The differentially connected controls allow two controlled engines to be synchronized with a master engine whose speed setting may be separately adjusted but adapted to be actuated in unison with the simultaneous control of the other engines, such a control system being illustrated in the United States Patent No. 1,454,505.

In four engined aircraft the problem of differentially controlling three engines for synchronizing with a master engine cannot be accomplished by means of the prior art structures such that all of the controls may be simultaneously actuated through a single controlling element.

The means provided in accordance with the principal object of the invention for differentially and simultaneously actuating a plurality of pairs of engine controls or the like, comprise a plurality of differentials having the elements thereof concentrically mounted for rotation about common axes, each differential including a pair of side gears and a connecting gear, the side gears being connected to separate control actuating shafts arranged in telescoping relation and adapted to rotate about a common journal axis and each connecting gear being secured to one of a plurality of telescoping shafts adapted to be separately rotatably actuated about their common axis to differentially actuate the related side gears and associated control actuating shafts and rotation of said connecting gear actuating shafts about the journal axis of the control actuating shafts simultaneously actuating the throttle control shafts in an equal degree.

A further object of the invention is the provision in combination with a differential control of the character described of a means independent of the differential mechanism for selectively actuating the control elements independent of the differential control means.

Other objects of the invention not specifically enumerated will appear by reference to the detailed description in the specification and to the appended drawings in which:

Fig. 1 is a front elevation view partly in section of a pilot's differential control unit.

Fig. 2 is a perspective view illustrating the differential control device of Fig. 1 as employed in conjunction with a remote separate manual throttle or other control means.

Fig. 3 is a fragmentary view of a vernier adjustment for the separate manual control devices illustrated in Fig. 2.

Referring now to Figure 1, which illustrates the pilot's control unit, the reference numeral 1 indicates a U shaped bracket or base having upstanding legs which serve as journal supports for the differential control mechanism hereinafter described.

A yoke 2 forming a main control lever is rotatably mounted for movement in a fore and aft direction and serves to journal a vertically disposed hollow shaft 3, provided at its upper end with a manual control knob 4 to provide for manual rotation of the shaft 3 about its longitudinal axis. At its lower end the shaft 3 has secured thereto a bevel type crown gear 5 which is adapted to mesh with each of a pair of bevel side gears 6 and 7 respectively, which are secured on the inner ends of hollow sleeves 8 and 9 respectively, which sleeves also serve as a journal support for the yoke 2. The sleeves 8 and 9 project through the legs of the bracket 1 and at their outer ends have the control levers 10 and 11 respectively, secured thereto. The control levers 10 and 11 have respectively, pivotally connected thereto control rods 13 and 14. As the control knob 4 is rotated in either direction about its axis the shaft 3 will correspondingly rotate the crown gear 5 to differentially actuate the bevel side gears 6 and 7 to thereby differentially actuate the control levers 10 and 11 and control rods 13 and 14 respectively, to move the same in opposite directions, while if the yoke 2 forming the lever is moved in a fore and aft direction the differential unit comprising the crown gear 5 and side gears 6 and 7 will be locked and the control levers 10 and 11 will then be displaced an equal amount in the same direction.

The hollow shaft 3 has journalled therein a shaft 15 which projects beyond the ends of the shaft 3, and at its upper end is provided with a control knob 16 similar to the knob 4 and adapted to rotate the shaft 15 in either direction about its longitudinal axis. At its lower end the shaft 15 has connected thereto a bevel type crown gear 17 which is placed below and concentric with the crown gear 5 previously mentioned. The crown gear 17 is adapted to mesh on either side with a pair of bevel type side gears 18 and 19 respectively, which are secured to the inner ends of the respective sleeve members 20 and 21 which are telescoped within the hollow sleeves 8 and 9 respectively, and projects outwardly thereof to serve as mounting means for the respective levers 22 and 23 which are adapted to actuate the respective control rods 24 and 25 pivotally connected to the lower ends thereof. The side gears 18 and 19 are mounted concentric with the side gears 6 and 7 respectively, and the entire assembly is retained by means of a rod 26 which passes through the sleeves 20 and 21, and is suitably provided at its outer end with enlarged heads which prevent the axial movement of the assembled parts. Manual rotation of the control knob 16 about its axis correspondingly rotates the shaft 15 and the crown gear 17 to differentially actuate the side gears 18 and 19 to move the control levers 22 and 23 in opposite directions, while fore and aft movement of the yoke 2 causes an equal deflection of the control levers 22 and 23 in the same directions.

The assembly above described is preferably mounted adjacent the instrument board of an aircraft within easy reach of the pilot and, by separately actuating the knobs 4 and 16, the pilot may differentially adjust the control levers 10 and 11, and 22 and 23 respectively, and by movement of the yoke 2 in a fore and aft direction may displace all of the control levers an equal amount and in the same direction. The manner in which the pilot's control is adapted to be connected through a separate manual control to the devices actuated as seen in Fig. 2 will now be described.

Referring to Fig. 2 the control rod 13 actuated by the control lever 10 is seen to be pivotally connected at its other end to the lower end of a lever 30 which is pivotally mounted on a shaft 35 supported by a suitable mounting structure and located at some distance remote from the pilot's control unit such as in the engineer's compartment of a multi-engine aircraft. At its upper end the lever 30 is provided with an arcuate sector 31 which is provided on its inner face with teeth 32 which are adapted to be engaged by a detent 33 carried by a lever 34 also pivotally mounted on the shaft 35. The lower end of the lever 34 is pivotally connected to one end of a control actuating rod 36 which may for example be suitably connected through means not shown to actuate an engine throttle valve, propeller pitch control or other instrumentality which it is desired to control. The control lever 34 is preferably made in such a manner that it may be moved sideways an amount sufficient to release the detent 33 from engagement between a respective pair of teeth on the sector 31 and thus disengaging the lever 34 from the lever 30 and allowing the lever 34 to be separately manually controlled as desired by the engineer and at any time to be released and thus reengage with the lever 30 to render the pilot's controls of the levers 30 and 34 effective. The control rod 14 actuated by the control lever 11 of the pilot's control unit is connected in a similar manner to a lever 37 which is also pivotally mounted on the shaft 35 and constructed in a manner identical with that previously described with reference to the lever 30. The lever 37 is adapted to cooperate with a lever 38 similar in all respects to the lever 34 and pivotally connected at its lower end to a control rod 39 adapted to control a throttle, propeller pitch control or other manual means in the same manner as the control rod 36. The pair of control rods 24 and 25 adapted to be actuated by the control levers 22 and 23 respectively of the pilot's differential control units, are pivotally connected at their outer ends to levers 40 and 43 respectively, which are actuated with manual control levers 41 and 44 respectively, of the same character as the previously described lever 34, the manual control levers 41 and 44 being adapted to actuate the control rods 42 and 45 in the same manner as previously described with reference to the control rod 36. It is thus seen that by actuation of the pilot's control unit, the control rods 36 and 39 may be differentially actuated by rotation of the control knob 4 of the pilot's unit or be simultaneously displaced in either direction by fore and aft displacement of the yoke 2 of the pilot's control unit and the control rods 42 and 45 may be actuated in a similar manner by rotation of the control knob 16 of the pilot's control unit or by displacement of the yoke 2 in a fore and aft direction.

In order to provide for a vernier adjustment of the manual control levers provided for actuation by the flight engineer, one form of vernier mechanism is illustrated as associated with the manual control unit comprising the levers 43 and 44 but may be, of course, similarly provided for all of the levers and such vernier control illustrated in detail in Figure 3.

As seen in Figure 3 the manual control lever 44 is formed in two portions, each pivotally mounted on the shaft 35 for free rotational movement, the portion of the lever 44 indicated by the reference numeral 44a being adapted to be pivotally connected at its lower end to the control rod 45, and at its upper end is suitably slotted as at 47 to be pivotally connected by means of the trunnions 46 to a nut 48 which is axially movable on the threaded shaft 49, the latter being adapted to be manually adjusted by means of the knob 50 and suitably journalled in a bracket 51 formed integral with the lever 44. A spring washer 52 is provided to take up any backlash and insure positive displacement of the nut 48. The flight engineer, by rotation of the control knob 50, may cause a feeding movement of the nut 48 in either direction to displace the lever 44a relative to the lever 44 to thereby secure a vernier adjustment in the position of the control rod 45 intermediate the adjustment obtained by movement of the control lever 44 between two adjacent teeth on the sector plate associated with the lever 43. By providing vernier control such as illustrated in Fig. 3 for each of the manual control levers 34, 38, 41 and 44, the engineer can make vernier adjustments to take care of the slight differences in speed or other characteristics of the respective engines to be manually controlled independent of the pilot's differential control unit and, after making the necessary manual adjustments, the further control of the power plants or other units may be then left entirely to the pilot's control unit, but at any time the engineer may disconnect the pilot's control unit with respect to any one or all of the control rods 36, 39, 42 or 45 to withdraw a respective engine from service or to check the operation thereof and at all other times the pilot may differentially control the respective power plants or variable pitch propellers as the case might be by adjusting first one pair of engines or other units into synchronism and then by actuation of the other control knob to bring the other pair of engines into synchronism with the first pair and thereafter to simultaneously actuate all of the four plant controls by a rocking movement of the yoke 2 about its pivotal axis.

While one preferred form of the invention has been illustrated in the drawings it will become apparent to those skilled in the art that many modifications and changes may be made therein falling within the scope of the invention defined by the appended claims.

I claim:

1. In a control system of the character described, a pair of differentials each including a pair of side gears and a connecting gear, the corresponding elements of each differential being arranged for rotation about common axes, a pair of transverse coaxial hollow shafts each respectively connected to the side gears of one of said differentials, a second pair of transverse coaxial shafts respectively telescopically arranged within said hollow shafts and connected respectively to the side gears of the other of said differentials, means including a yoke for rotatably mounting said differentials and transverse shafts for simultaneous rotation about the common axis of said shafts, a pair of vertically disposed telescoping shafts rotatably supported by said yoke, each of said last named shafts being secured to a respective one of said connecting gears, and control elements respectively associated with said transverse shafts and actuated thereby, whereby manual rotation of either of said vertical shafts differentially actuates a corresponding pair of said control elements while rotation of said differential units about the said common axis of said transverse shafts causes simultaneous actuation of all of said control elements.

2. A control mechanism for controlling a plurality of engine throttles and the like comprising at least one pair of differential units each including a pair of side gears and a connecting gear, the corresponding gears of each unit being arranged in parallel concentric relation and the said side gears having a common transverse axis, control elements each respectively connected to one of said side gears, common means journalling said differentials for rotation about said common axis, manually rotatable operating shafts arranged in telescoping relation and each connected to a respective one of said connecting gears to actuate the same to thereby differentially actuate a related pair of said control elements and rotation of said operating shafts about said common axis causing rotation of said differentials as a unit about said common axis to cause simultaneous actuation of said control elements.

3. A control mechanism for controlling a plurality of engine throttles and the like comprising at least one pair of differential units each including a pair of side gears and a connecting gear, the corresponding gears of each unit being arranged in parallel concentric relation and the said side gears having a common axis, control elements each respectively connected to one of said side gears, common means journalling said differentials for rotation about said common axis, manually rotatable operating shafts arranged in telescoping relation and each connected to a respective one of said connecting gears to actuate the same and to thereby differentially actuate a related pair of said control elements and rotation of said operating shafts about said common axis causing rotation of said differentials as a unit about said common axis to cause simultaneous actuation of said control elements, a plurality of pivoted levers each operatively connected to a respective one of said control elements, and individual means connecting each respective lever to a respective device to be controlled, said last-named means including a manually controlled device for separately actuating the device to be controlled independent of the differential control therefor.

4. In a multiple control mechanism of the character described, a support, separate pairs of telescoping shafts rotatably journalled in said support for rotation about a common axis, a plurality of bevel side gears each connected to one of said shafts and arranged in oppositely disposed concentric pairs, a bevel crown gear operatively associated with each respective pair of side gears, a yoke extending normal to said common axis and rotatable with respect thereto, a pair of telescoping shafts journalled in said yoke and respectively connected to said crown gears, manual means for independently rotating each of said last named shafts to cause differential rotation of an associated pair of said first named shafts and separate control arms associated with each of said first named shafts and adapted to actuate the devices to be controlled, whereby actuation of said manual means provides differential adjustment of said control arms and rotation of said yoke causes simultaneous actuation of said control arms in the same direction.

DONALD L. PUTT.